United States Patent
Hancock

(10) Patent No.: US 11,465,065 B2
(45) Date of Patent: Oct. 11, 2022

(54) APPARATUS FOR PROVIDING AN ANIMATED IMAGE FOR A VIEWER

(71) Applicant: Philippa Claire Barbara Hancock, Beaconsfield (GB)

(72) Inventor: Philippa Claire Barbara Hancock, Beaconsfield (GB)

( * ) Notice: Subject to any disclaimer, the term of this patent is extended or adjusted under 35 U.S.C. 154(b) by 0 days.

(21) Appl. No.: 16/956,610

(22) PCT Filed: Dec. 18, 2018

(86) PCT No.: PCT/GB2018/000157
§ 371 (c)(1),
(2) Date: Jun. 21, 2020

(87) PCT Pub. No.: WO2019/122796
PCT Pub. Date: Jun. 27, 2019

(65) Prior Publication Data
US 2020/0391128 A1    Dec. 17, 2020

(30) Foreign Application Priority Data
Dec. 20, 2017  (GB) ..................................... 1721520

(51) Int. Cl.
*A63H 33/22* (2006.01)
*A63H 13/20* (2006.01)
*A63H 33/00* (2006.01)
*G03B 25/00* (2006.01)

(52) U.S. Cl.
CPC ........... *A63H 13/20* (2013.01); *A63H 33/006* (2013.01); *A63H 33/22* (2013.01); *G03B 25/00* (2013.01)

(58) Field of Classification Search
CPC .............................. A63H 33/006; A63H 33/22
See application file for complete search history.

(56) References Cited

U.S. PATENT DOCUMENTS

| | | | | |
|---|---|---|---|---|
| 1,925,136 A * | 9/1933 | Conover | ................. | A63H 33/22 352/101 |
| 2,538,407 A * | 1/1951 | Allen | ...................... | G09F 11/23 352/101 |
| 3,640,019 A * | 2/1972 | Jones | ...................... | A63H 1/20 446/243 |
| 4,026,042 A * | 5/1977 | Ames | ..................... | A63H 33/22 434/101 |
| 6,097,468 A * | 8/2000 | Muehlenhard | ......... | G03B 25/00 352/101 |
| 7,476,142 B2 * | 1/2009 | Mastrosimone-Gese | ..................... | A63H 33/006 446/227 |
| 10,228,090 B2 * | 3/2019 | Bearsch | ................. | F16M 11/38 |

* cited by examiner

*Primary Examiner* — John A Ricci
(74) *Attorney, Agent, or Firm* — Michael D. Eisenberg

(57) ABSTRACT

Apparatus (2) for providing an animated image for a viewer, which apparatus comprises: (i) a device (4, 6, 10, 12) for providing the animated image; and (ii) securing means (14) for securing the apparatus (2) to a part (16) of a structure (18) such that the apparatus (2) is fixed with respect to the structure (18), and such that the device (4, 6, 10, 12) is operable by the viewer in order for the viewer to see the animated image.

20 Claims, 11 Drawing Sheets

APPARATUS FOR PROVIDING AN ANIMATED IMAGE FOR A VIEWER

This invention relates to apparatus for providing an animated image for a viewer. The viewer will typically be a young child, but the viewer may be an older person if desired. The viewer may also be an animal.

There are many known different types of apparatus for providing an animated image for a viewer. Well known examples of such apparatus for providing optical illusions via the phenomena known as persistence of vision, are zoetropes, praxinoscopes, phenakistiscopes, thaumatropes and flicker/flip books. They have all been known for over one hundred years. Modern versions of such apparatus are disclosed in my UK Patent Application Nos. GB 2493168 A and GB 2511117 A. In GB 2511117 A, the apparatus has a rotatable member in the form of a driven wheel which is moved along a surface. The apparatus may be a push along toy or part of a child's tricycle. The apparatus is not able to be used for commercial applications where the apparatus needs to be stationary. GB 2493168 A discloses apparatus which is stationary and which is in the form of an activity wheel. The activity wheel may be operated from inside, in the nature of a hamster wheel. The operation of the wheel from inside by a hamster may be such that the hamster obscures the generated animated image for the viewer. Also, the apparatus is not designed for construction as a simple toy which requires the user's participation, and which is easy to operate and does not require a hamster or active participation within the wheel itself.

It is an aim of the present invention to provide apparatus which avoids the above mentioned problems.

Accordingly, in one non-limiting embodiment of the present invention there is provided apparatus for providing an animated image for a viewer, which apparatus comprises:
(i) a device for providing the animated image; and
(ii) securing means for securing the apparatus to a part of a structure such that the apparatus is fixed with respect to the structure, and such that the device is operable by the viewer in order for the viewer to see the animated image.

The apparatus of the present invention is able to be constructed as a toy for a viewer such as a child. The securing means is able to secure the apparatus to a part of a structure such for example as a table, a baby's high chair, a cot or a pram. The viewer, for example a child, is able to manually rotate the rotatable member. In the case of a child, this helps to encourage the viewer's interest, eye to hand co-ordination, motor skills and to encourage development of the visual system in eye and brain during early childhood. The apparatus is also able to spark the interest and amusement of pet animals by the interactive nature of the apparatus and the resulting animated image. The viewer is easily able to rotate the apparatus because the securing means secures the apparatus to a part of the structure, and the structure is one that does not require the apparatus to move along the ground. The apparatus is fixed to the structure, and the structure may be a structure which retains the child, for example the baby's chair, the cot or the pram.

The securing means is advantageous for viewers such as young babies and children who are not likely to have gentle and/or accurate motor skills that come with child development. Rough handling of the device on its own would result in instability, and so the apparatus would quickly fall out of reach of the viewer. The securing means is able to prevent this.

The apparatus may be one in which the device comprises:
a rotatable member;
(ii) mounting means for mounting the rotatable member about an axis;
(iii) a plurality of viewing formations in the rotatable member; and
(iv) a series of progressively changing representations which are viewable through the viewing formations by the viewer, whereby the viewer sees the animated image when the rotatable member is rotated;
and in which:
(v) the mounting means and the securing means are fixed with respect to the structure, and the rotatable member is manually rotatable by the viewer in order for the viewer to see the animated image through the viewing formations.

The apparatus may be one in which the rotatable member has a periphery which is provided with raised portions, and in which the raised portions are for being engaged by a hand of the viewer in order to manually rotate the rotatable member. The raised portions may be of any suitable and appropriate size and shape.

The apparatus may be one in which the rotatable member is configured to be operated from the outside of the rotatable member by using vertical force.

The apparatus may be one in which the securing means is a suction device for securing the apparatus to a flat surface. The flat surface may be, for example, a table top or a tray attached to a baby's highchair. Alternatively, the apparatus may be one in which the securing means is an adhesive, a hook and loop system, a clamp, strap, clip, hook, tie, buckle, lock, catch, latch, stay, magnetic device, a screw device, or any other securing device for securing the apparatus to where required, for example to a bar. The bar may be a bar of a cot, or it may be part of a bumper bar/arm bar/child's handrail of a pram. The hook and loop system may be Velcro (Registered Trade Mark). For use of the apparatus by pets, the securing means may be for securing the apparatus to a structure to give stability, ready access and ease of use.

The securing means may cause the apparatus to extend above the part of the structure. Alternatively, the securing means may cause the apparatus to extend to a side of the part of the structure. Alternatively, the securing means may cause the apparatus to extend below the part of the structure.

The apparatus may include a drive member which is for manual operation by the viewer in order to manually operate the device. The drive member may be a lever. Alternatively, the drive member may be a handle or a crank. Other types of drive member may be employed.

The apparatus may be one in which the rotatable member has viewing formations that are shaped to be attractive to the viewer. Such viewing formations may be, for example, animal figures, bows and flowers. These viewing formation will thus differ from the standard rectangular slits seen on zeotropes, praxinoscopes and phenakistiscopes.

The apparatus may be one in which the rotatable member has panels which are decorated to enhance visual attraction and/or to complete the shape of a viewing formation, for example a pair of eyes above a cut-out animal formation.

The apparatus may be one in which the rotatable member has a colourway which is light and/or brightly coloured.

The apparatus may be one in which the rotatable member has side panels which hold one or more decorative patterns and/or representations to increase the entertainment for the viewer. Whilst the rotatable member is rotating, the side panels may then show an additional animation or additional animations to a central path where key representations reside.

The apparatus will usually be one in which there is one of the rotatable members. If desired however, the apparatus may be one in which there are more than one of the rotatable members, and in which the rotatable members are mounted side by side such that the rotatable members are able to be rotated and viewed separately or together as determined by the viewer. If the rotatable members are rotated together, then may be spun in different directions and/or at different speeds and/or at different times.

The apparatus may include gear means. The gear means may be for increasing the speed of the rotatable member. Alternatively, the gear means may simply drive the rotatable member at a non-increased speed. The gear means may be positioned between the mounting means and the securing means. The gear means may be positioned elsewhere on the apparatus if desired. The gear means may include toothed gear wheels. Other types of gear means may be employed, for example belt-drive gear means. The gear means, for example toothed gear wheels, may drive other units of the apparatus, for example smaller units of the apparatus.

The apparatus may include audio means which produces sound when the apparatus is operated. The sound produced by the audio means may be appropriate for the animated image.

The audio means may be operatively linked to the apparatus such that the audio means operates consequent upon the rotation of the rotatable member.

The apparatus may include light means for generating light consequent upon the rotation of the rotatable member.

The apparatus may be one in which the audio means and the light means are electrically operated. In this case, the apparatus may include a battery compartment for receiving one or more batteries for providing the required electrical power. Alternatively or additionally, the apparatus may be one in which the apparatus includes a dynamo device for generating the required electrical power. Thus, for example, rotation of the rotatable member could cause the dynamo device to rotate and thereby generate the required electrical power. Alternatively or additionally, the required electrical power may be from solar energy, for example via one or more solar panels, solar strips, or other solar formations. Alternatively, or additionally, the required electrical power may be derived from kinetic energy or be instigated by vibration sensors.

The motion required by the apparatus may be provided by the viewer as indicated above. Alternatively or additionally, the motion required by the apparatus may be provided via a battery source, solar power, kinetic energy or vibrations etc.

If desired, the apparatus may be one in which the audio means is a non-electrical mechanical device. In this case, the non-electrical mechanical device may be a flap which engages with a series of protuberances on the rotatable member. When this happens, the flap will generate a noise. Other types of non-electrical mechanical devices may be employed.

The apparatus of the invention may include a joint for enabling the device to be mounted at different angles with respect to the structure. The joint may be a universal joint providing 360° of rotation. The device may thus be mounted at any convenient angle for operating the device, for example for rotating the rotatable member. This may be especially useful for operation of the apparatus by very young children who need to be strapped into highchairs or prams and are thus in a fixed position.

The joint may be positioned between the mounting means and the securing means. The joint may be positioned elsewhere if desired.

The apparatus may include locking means for locking the device in a chosen position on the joint. Any suitable locking means may be employed so that, for example, the locking means may be a screw locking means or a clamp locking means. The locking means is able to ensure that operation of the device by the viewer does not move the device about the joint such that the device member is then not mounted at the required angle with respect to the structure. An alternative to having a device that is locked in position is to have an unlocked device that is movable in an unpredictable manner, thereby adding to the fun of operating the apparatus.

The apparatus may be one in which the device is a zoetrope. In this case, the viewing formations will typically be slots.

Alternatively, the apparatus of the present invention may be one in which the device is a praxinoscope. In this case, the viewing formations will typically include mirrors.

Alternatively, the apparatus of the present invention may be one in which the device is a phenakistiscope. In this case, the phenakistiscope may comprise two discs which rotate, with the viewing formations being in one of the discs. The discs may rotate in the same or opposite directions.

Alternatively, the apparatus of the present invention may be one in which the device is a thaumatrope or a flicker/flip book. With a thaumatrope or a flicker/flip book, there is no need for a rotatable member having viewing formations and/or outer panels. The thaumatrope and the flicker/flip book may use the flicker/effect and persistence of vision that comes from the movement of pages, platforms or leaves themselves.

Embodiments of the invention will now be described solely by way of example and with reference to the accompanying drawings in which.

Figure 1:
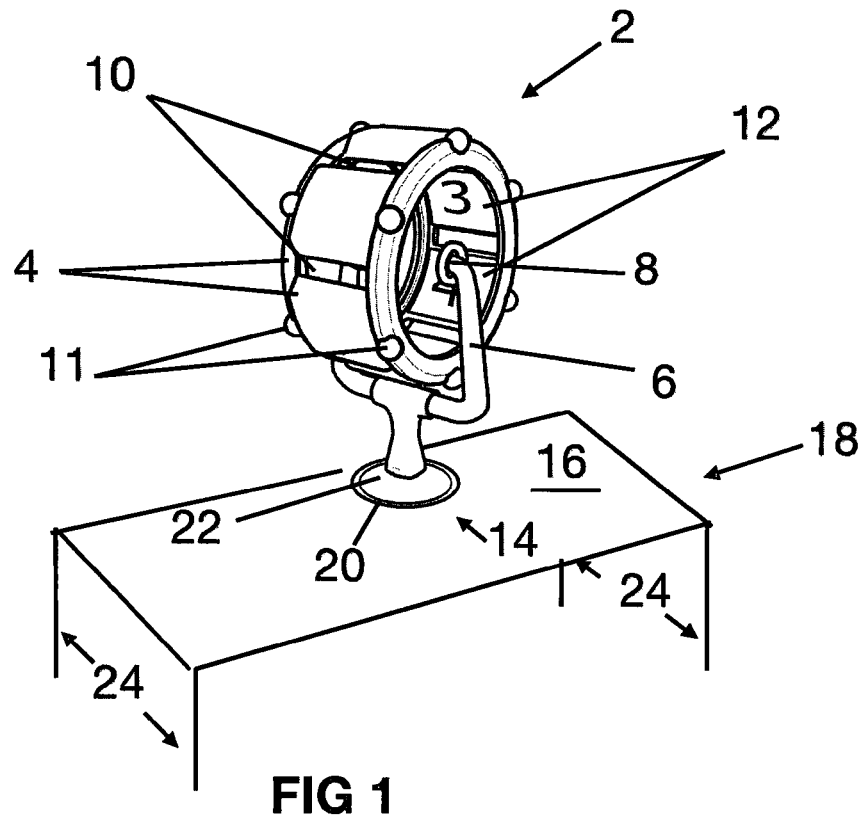
FIG. 1 shows first apparatus of the present invention.
Figure 2:
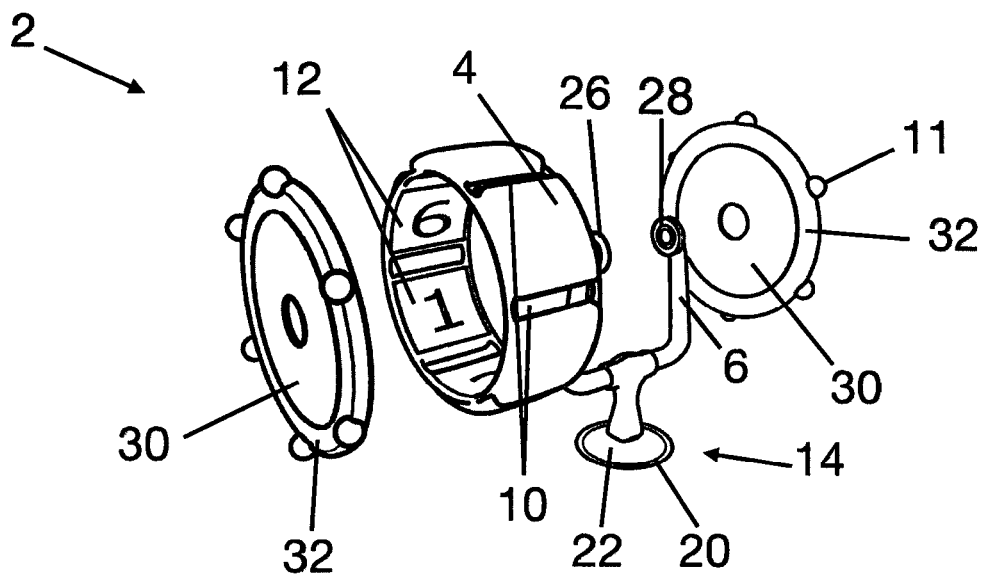
FIG. 2 is an exploded view of the apparatus shown in FIG. 1.

Referring to FIGS. 1 and 2, there is shown first apparatus 2 for providing an animated image for a viewer. The apparatus 2 comprises a rotatable member 4, and mounting means 6 for mounting the rotatable member 4 about an axis 8. A plurality of viewing formations 10 are provided in the rotatable member 4. Raised portions 11 are provided on the rotatable member 4. The apparatus 2 includes a series of progressively changing representations 12. The progressively changing representations 12 are viewable through the viewing formations 10 by the viewer, whereby the viewer sees the animated image when the rotatable member 4 is rotated. The raised portions 11 are able to be engaged by a hand of a viewer in order to manually rotate the rotatable member 4. The components 4, 6, 10, 12 form a device which provides the animated image.

The apparatus 2 includes securing means 14 for securing the apparatus 2 to a part 16 of a structure 18. The apparatus 2 is secured such that the mounting means 6 and the securing means 14 are fixed with respect to the structure 18, and the rotatable member 4 is manually rotatable by the viewer in order for the viewer to see the animated image through the viewing formations 10.

As can be seen from FIGS. 1 and 2, the securing means 14 is a suction device having a suction pad 20 mounted to the underside of a disc member 22. The structure 18 is in the form of a table having legs 24. The part 16 is formed by the surface of the table.

FIG. 2 illustrates how the mounting means 6 has two inwardly extending parts 26, 28 which provide the axis 8. The two parts 26, 28 are spaced apart as shown and they do not form an axle. This is because an axle would interrupt the vision of a viewer who was using the apparatus 2 and looking through the viewing formations 10. The rotatable member 4 is able to fit to the parts 26, 28 by discs 30 and rings 32. The discs 30 will typically be transparent in order to allow light into the inside of the rotatable member 4 so that the progressively changing representations 12 can be seen by the viewer through the viewing formations 10. If the inside of the rotatable member 4 were to be illuminated, then the discs 30 could be transparent, opaque or completely non-transparent. If desired, the inside of the discs 30 may hold a pattern or other representations which add another animation or two given, that there are two panels per rotatable member.

Figure 3:
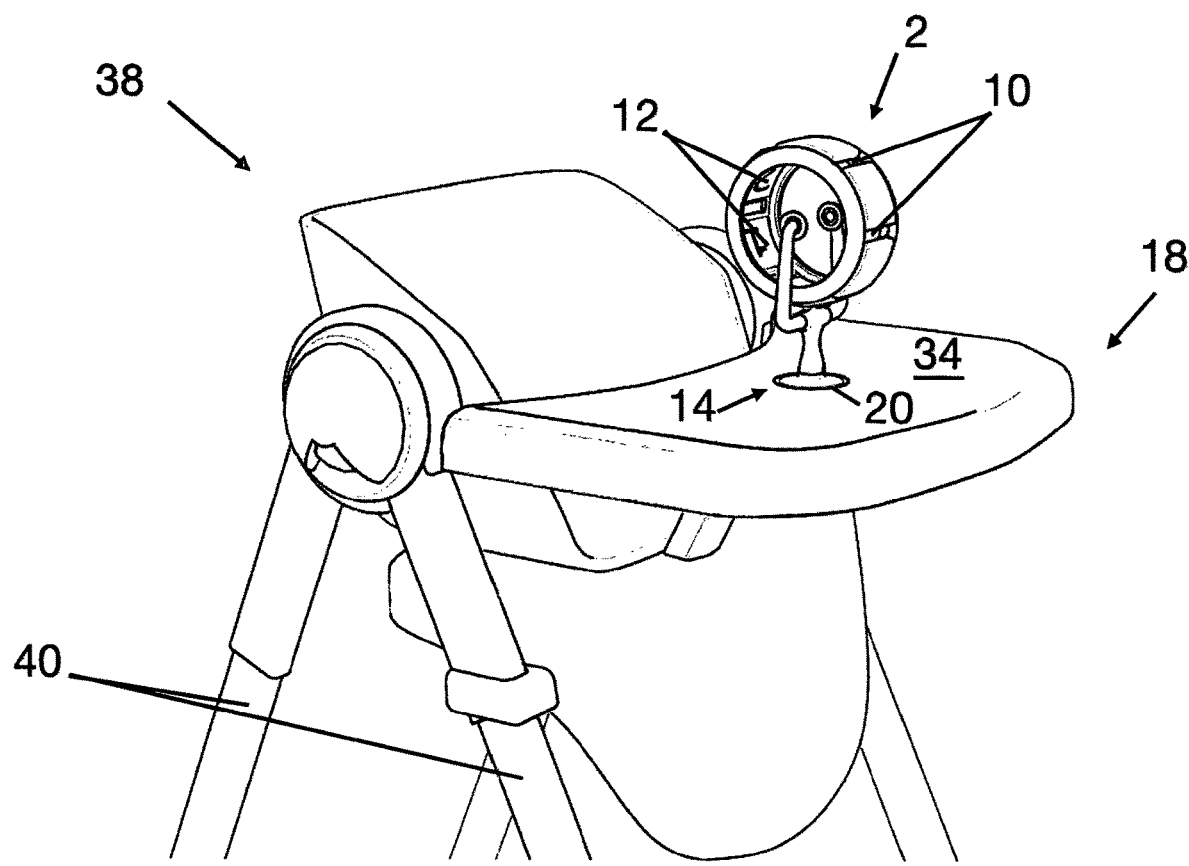
FIG. 3 shows the first apparatus of the present invention but in use on a different structure and modified to omit decorative balls.

FIG. 3 shows the apparatus 2 in position on a tray 34 of a baby's highchair 38. The highchair 38 has legs 40.

Referring now to FIGS. 4-17, similar parts have been given the same reference numerals for ease of comparison and understanding.

Figure 4:
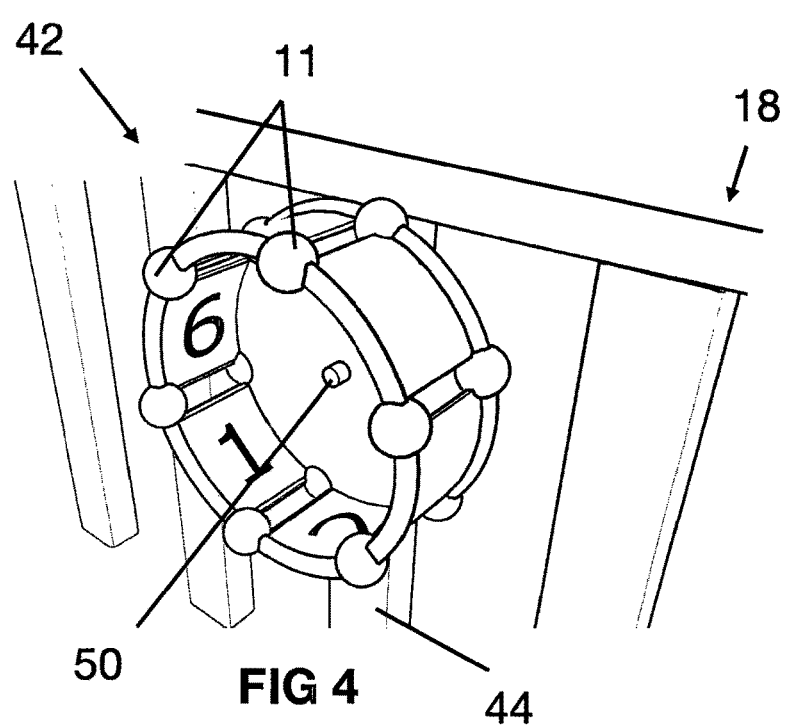
FIG. 4 is a front perspective view of second apparatus of the present invention.
Figure 5:
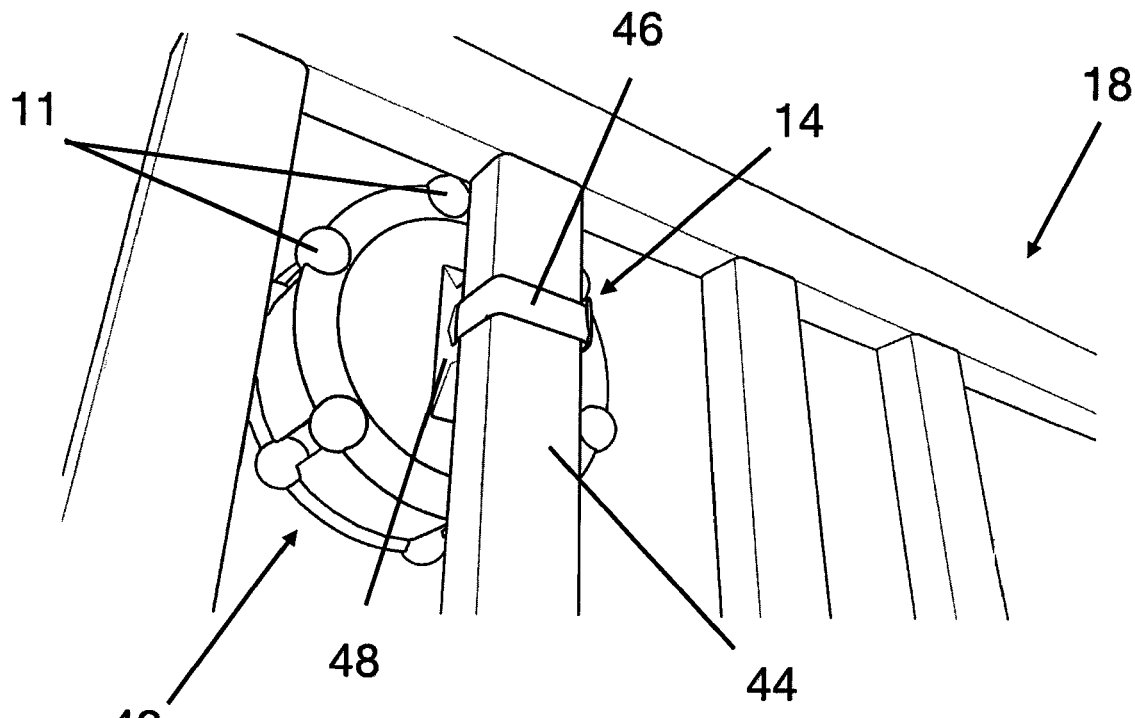
FIG. 5 is a rear perspective view of the apparatus shown in FIG. 4.
Figure 6:
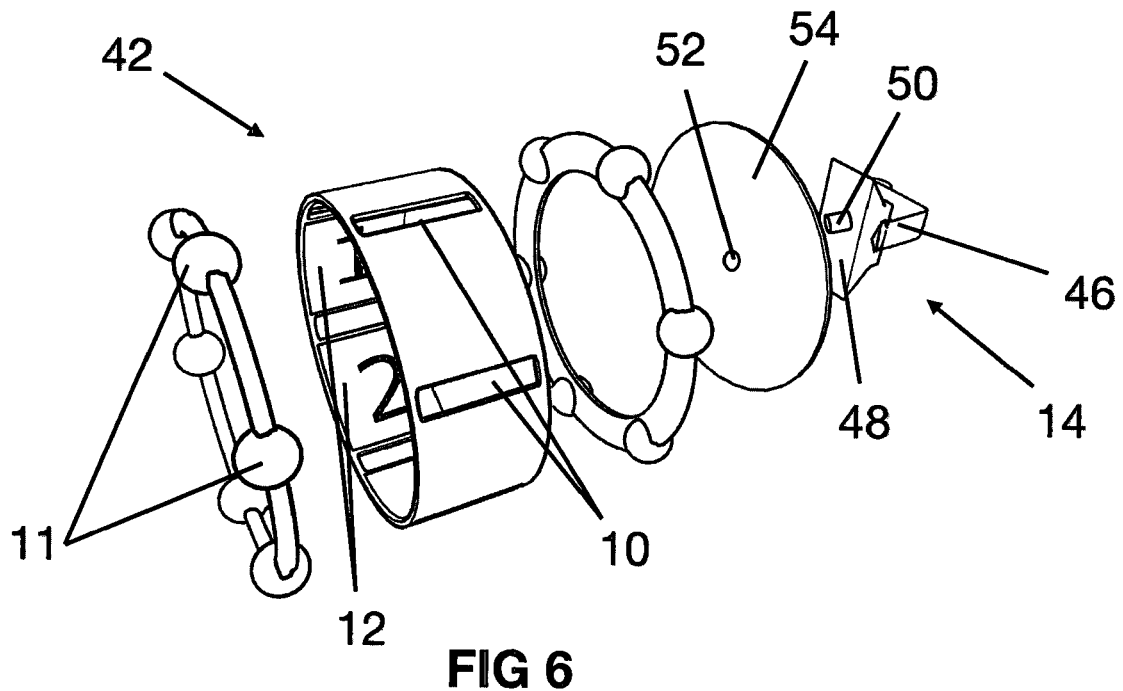
FIG. 6 is an exploded view of the apparatus shown in FIG. 4.

In FIGS. 4, 5 and 6, there is shown second apparatus 42 which is attached to a bar 44 of a structure 18 in the form of a cot. FIGS. 5 and 6 shows the securing means 14 comprising a strap 46 which is tightened around the bar 44. The strap 46 mounts a plate 48. FIG. 5 shows that the plate 48 has a pivot member 50 which provides the axis 8. The pivot member 50 extends through an aperture 52 in a side disc 54.

Figure 7:
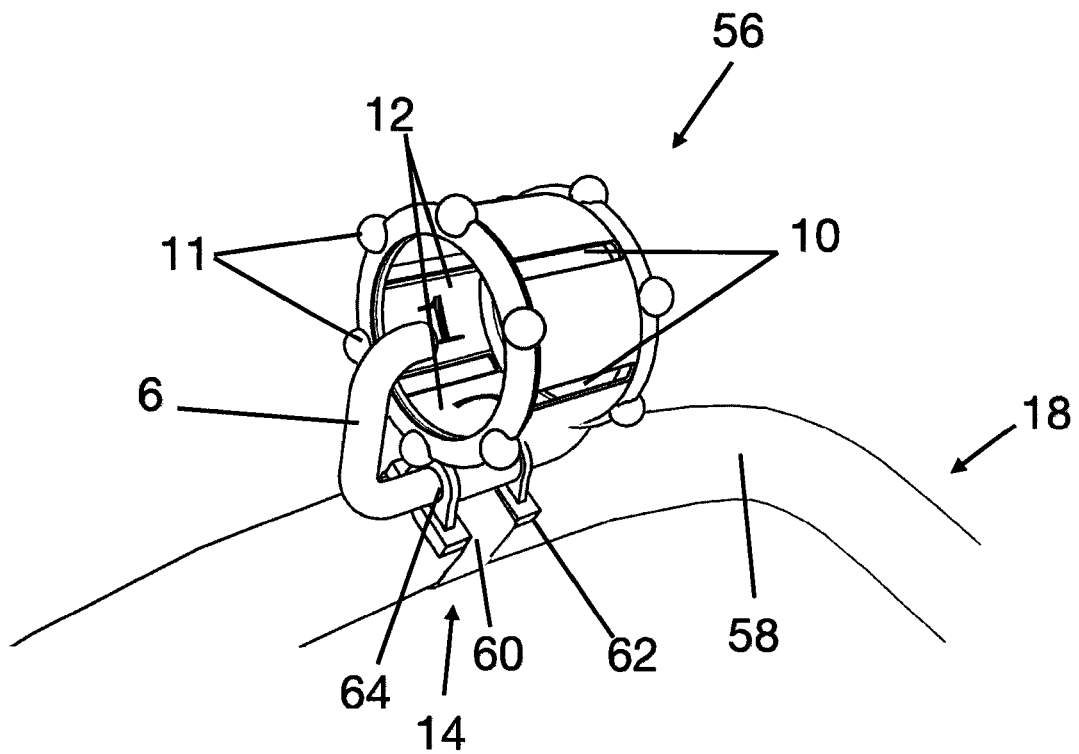
FIG. 7 shows third apparatus of the present invention.
Figure 8:
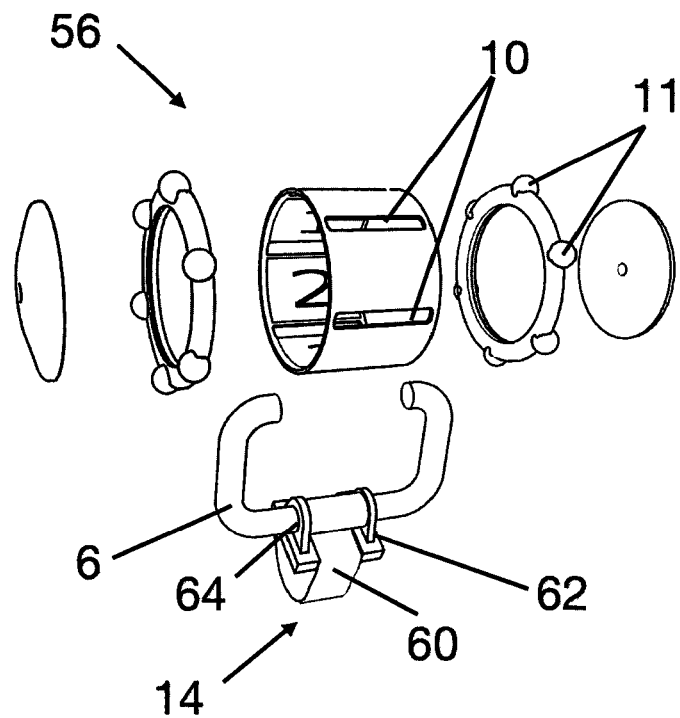
FIG. 8 is an exploded view of the apparatus shown in FIG. 7.

FIGS. 7 and 8 show third apparatus 56 secured to a bumper bar/child's handrail/arm bar 58 forming part of a structure in the form for a pram. The apparatus 56 has securing means 14 having a strap 60 which fastens around the bar 58, and a formation 62 which is mounted on the strap 60 and which has a through bore 64. The through bore 64 receives part of the mounting means 6 as shown in FIG. 8.

Figure 9:
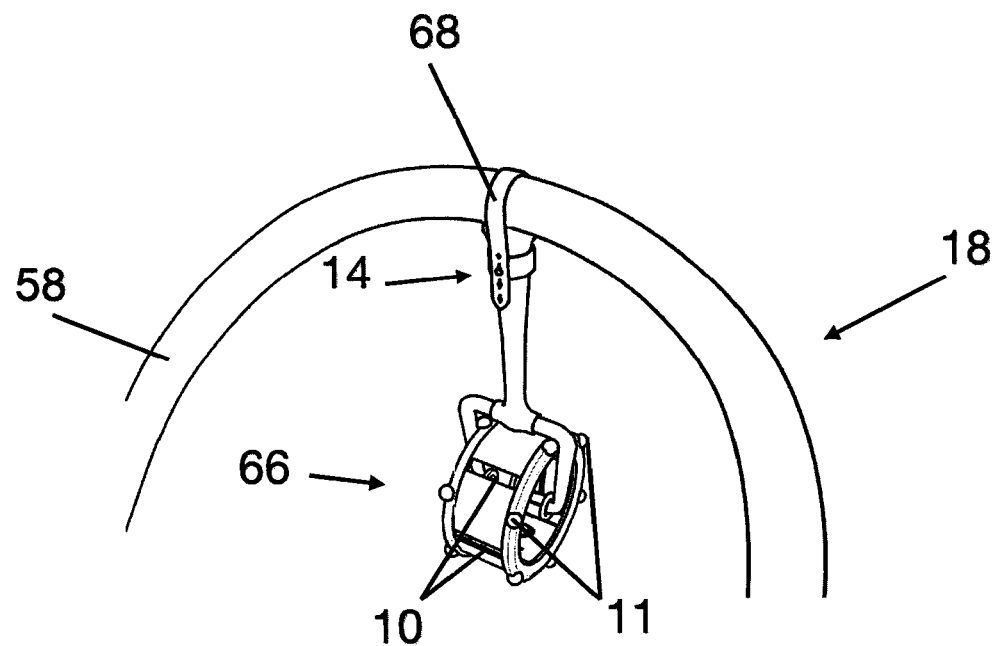
FIG. 9 shows fourth apparatus of the present invention.
Figure 10:
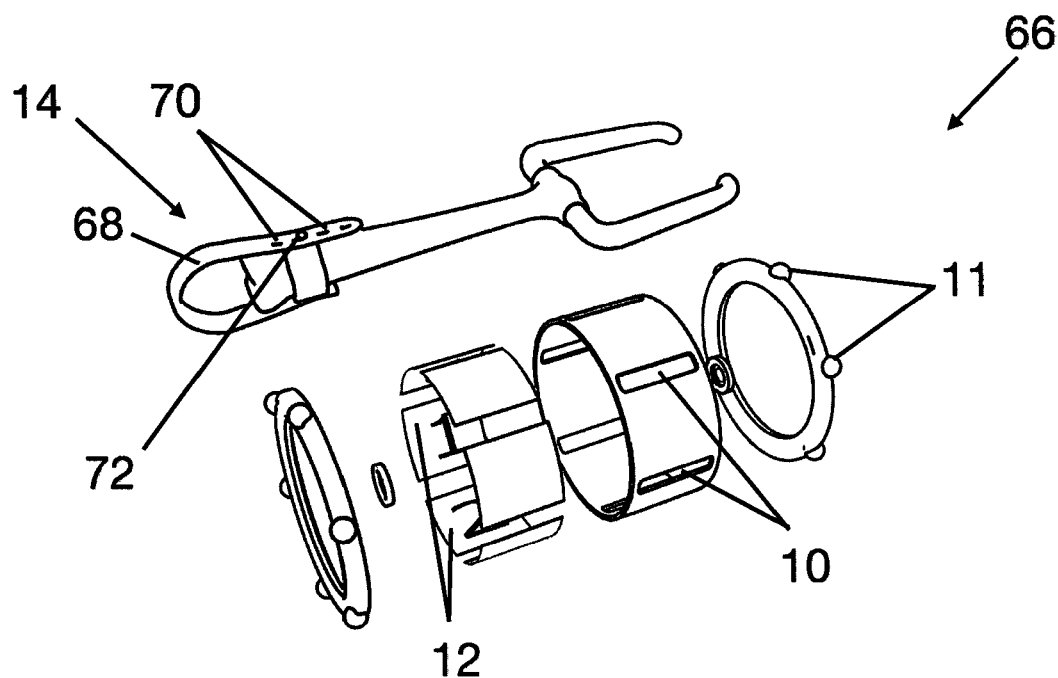
FIG. 10 is an exploded view of the apparatus shown in FIG. 8.
Figure 11:
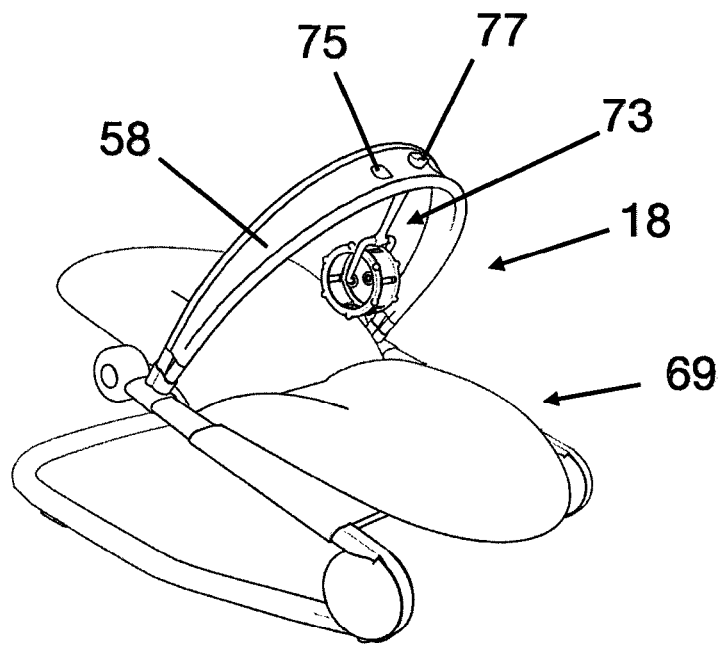
FIG. 11 shows fifth apparatus of the present invention.

FIGS. 9 and 10 show fourth apparatus 66 in which the securing means 14 is a strap 68 which is adjustably fastenable around the arch 58 of a bouncing baby seat 69 shown in FIG. 11. The adjustment is afforded by a series of apertures 70 able to receive a pin 72. In alternative embodiments of the invention, the strap 68 may secure the apparatus 66 to a cot, a car seat or other structure.

FIG. 11 shows fifth apparatus 73 which is like the fourth apparatus but which has different securing means 14. In the apparatus 73, the securing means 14 has two end arms 75, 77 which extend the arch 58 as shown and are secured in position by an appropriate means.

It will be appreciated from FIGS. 1, 2 and 3 that the securing means causes the apparatus 2 to extend above the part 16 of the structure 18. In FIGS. 4, 5 and 6, the securing means 16 causes the apparatus 42 to extend to the side of the bar 44 of the structure 18. In FIGS. 7 and 8, the securing means 14 secures the apparatus 58 such that it extends above the bar 48 of the structure 18. In FIGS. 9, 10 and 11 the securing means 14 secures the apparatus 66 such that it extends below the arch 58 of the structure 18.

Figure 12:
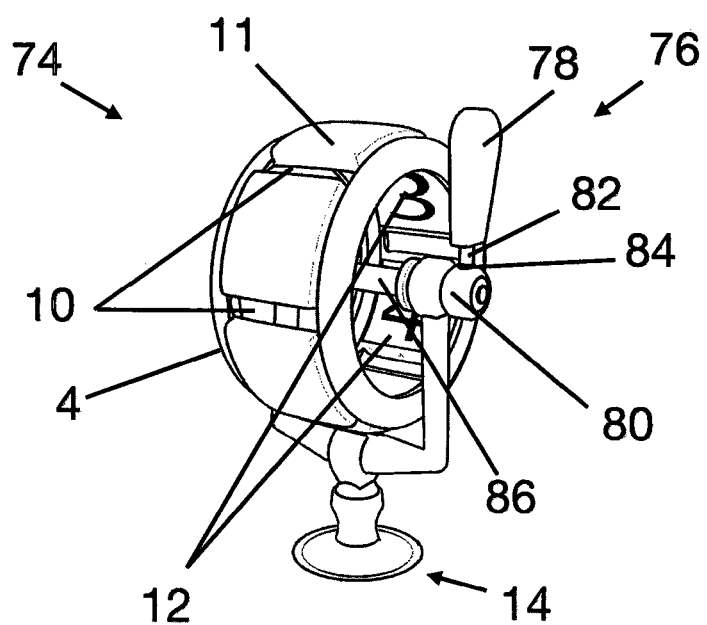
FIG. 12 shows sixth apparatus of the present invention.
Figure 13:
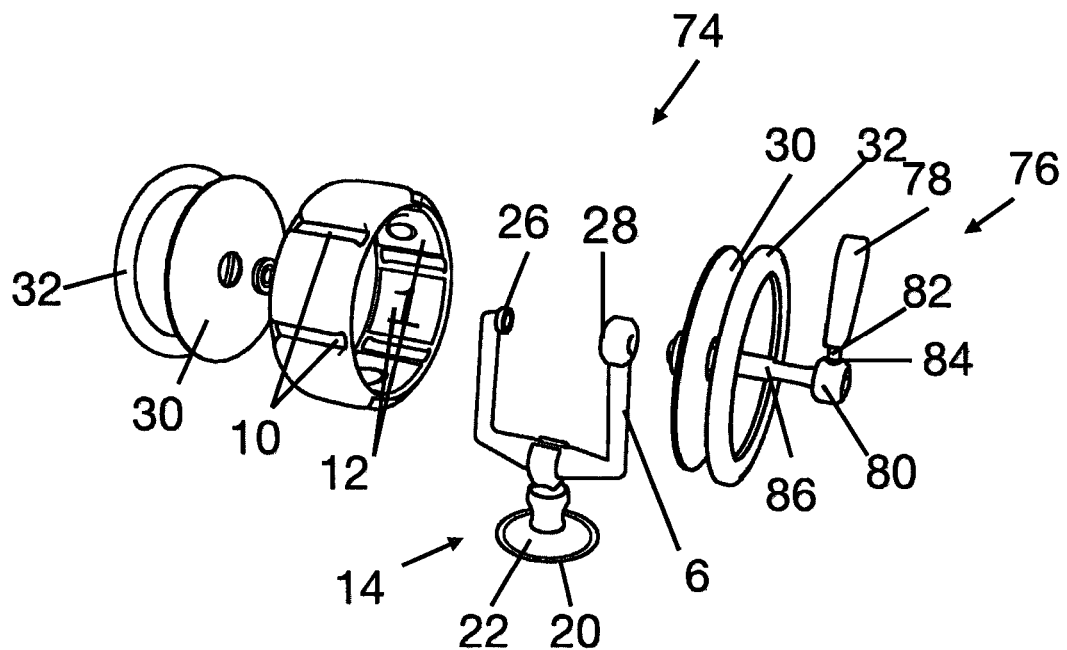
FIG. 13 is an exploded view of the apparatus shown in FIG. 12.

FIGS. 12 and 13 show sixth apparatus 74 which is like the apparatus 2 but which includes a drive member 76 for manual operation by the viewer in order to manually rotate the rotatable member 4. The drive member 76 comprises a lever 78 and a sleeve 80. The lever 78 has a screw-threaded shank portion 82 which screws into an aperture 84 in the sleeve 80 and thus locks the drive member 76 to an axle 86 extending completely through the rotatable member 4. The lever 78 may also just pull forward 45° to rotate the rotatable member, before springing back into its first position.

Figure 14:
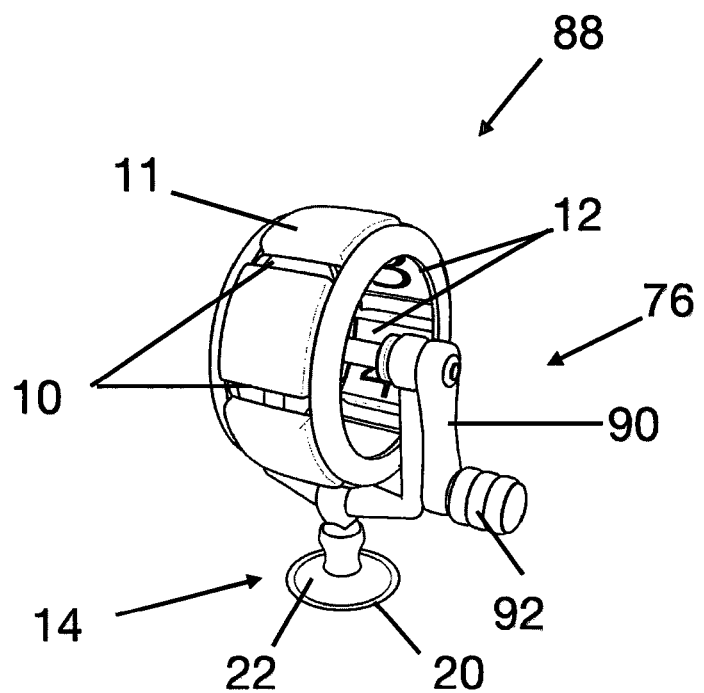
FIG. 14 shows seventh apparatus of the present invention.
Figure 15:
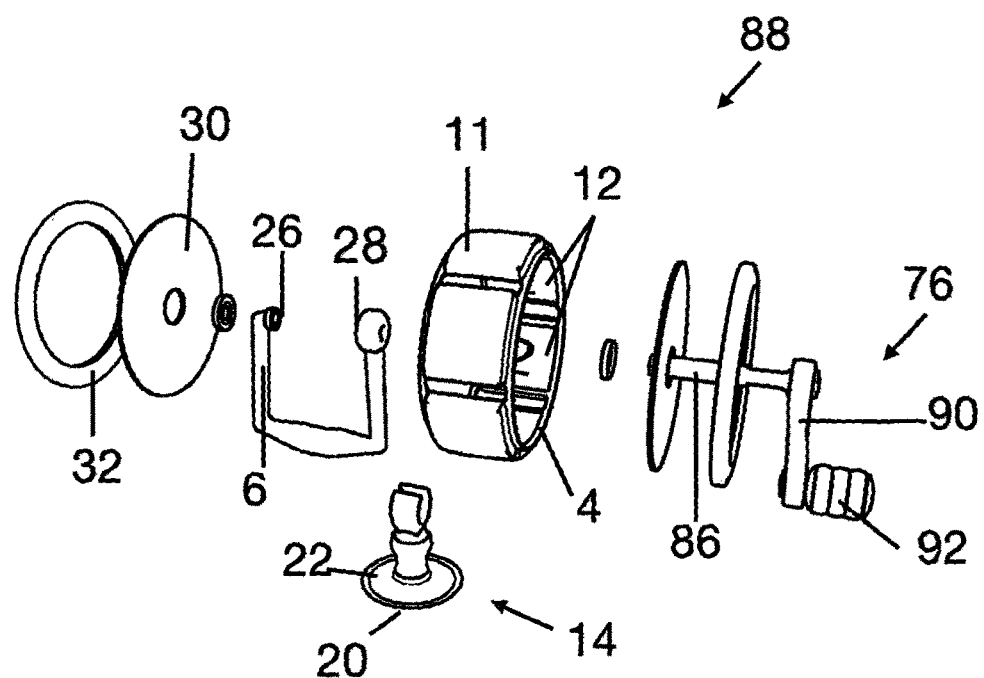
FIG. 15 is an exploded view of the apparatus shown in FIG. 14.

FIGS. 14 and 15 show seventh apparatus 88 which is like the apparatus 74 except that the drive member 76 comprises a handle 90 having a knob 92. The knob 92 is gripped and the handle 90 is rotated. This is an alternative to rotation via rotation the lever 78 in the apparatus 74.

Figure 16:
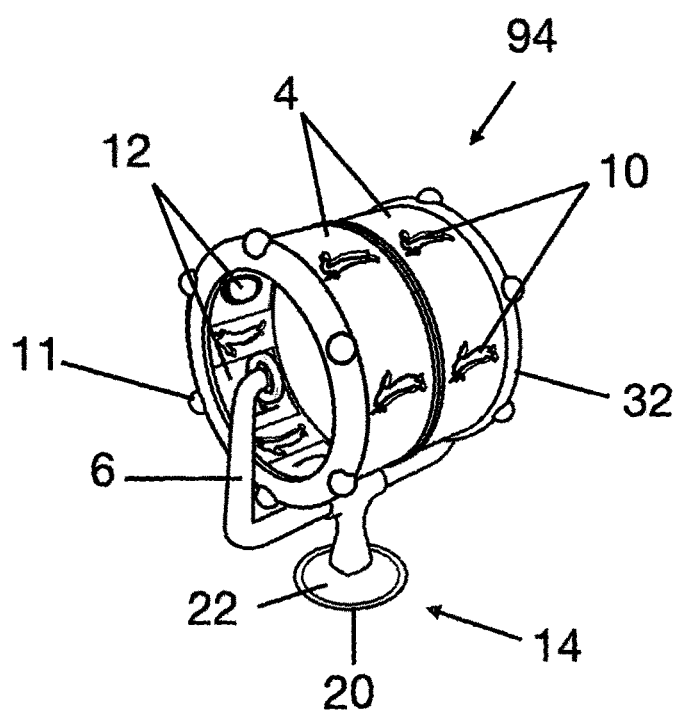
FIG. 16 shows eighth apparatus of the present invention.
Figure 17:
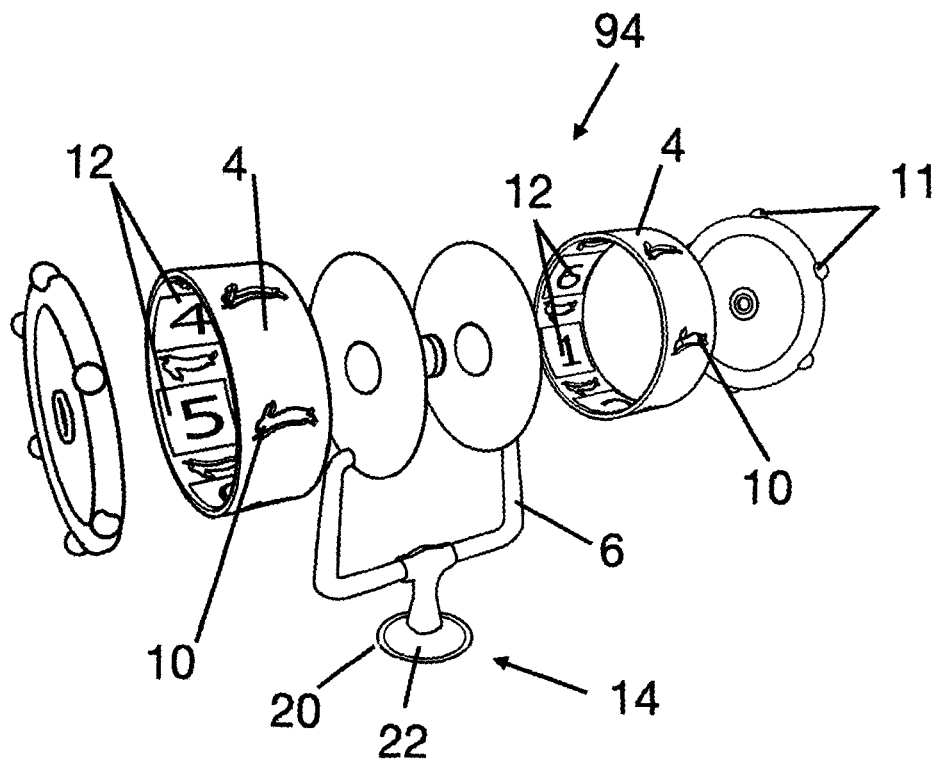
FIG. 17 is an exploded view of the apparatus shown in FIG. 16.

FIGS. 16 and 17 show eighth apparatus 94 which is like the apparatus 2 except that there are two of the rotatable members 4 mounted on the mounting means 6. The two rotatable members 4 are mounted side by side as shown. Thus the two rotatable members 4 are able to be rotated and viewed separately or together, as determined by the viewer. The two rotatable members 4 can also be rotated in different directions to one another.

Figure 18:
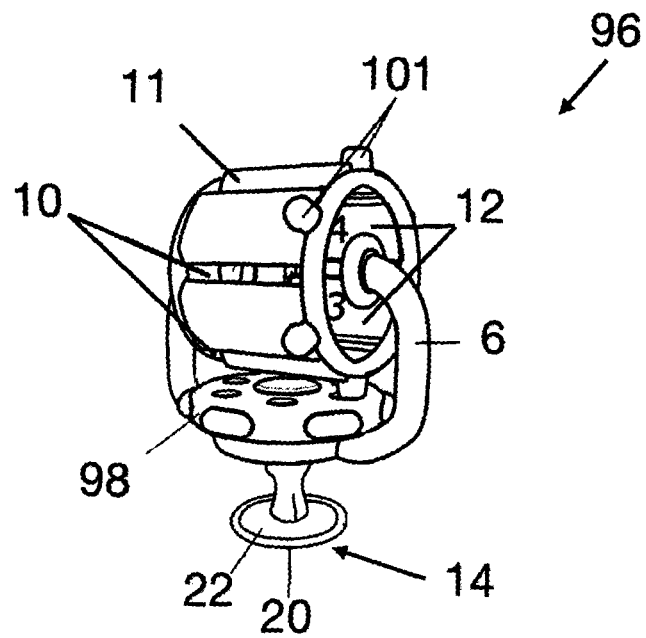
FIG. 18 shows ninth apparatus of the present invention.
Figure 19:
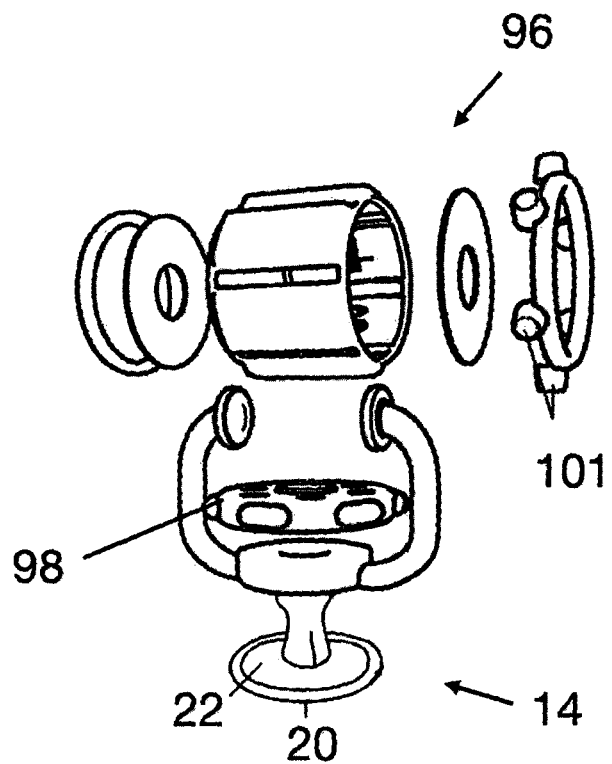
FIG. 19 is an exploded view of the apparatus shown in FIG. 18.

FIGS. 18 and 19 show ninth apparatus 96 which is like the apparatus 2 but which additionally includes toothed gear wheels 101 for driving the part 98 and/or driving other units of apparatus of the invention. In another embodiment (not shown) the apparatus 96 is provided with gear means for increasing the speed of rotation of the rotatable member 4. The gear means may be positioned between the mounting means 8 and the securing means 14. The gear means includes toothed gear wheels (not shown). Other types of gear arrangements may be employed.

Figure 20:
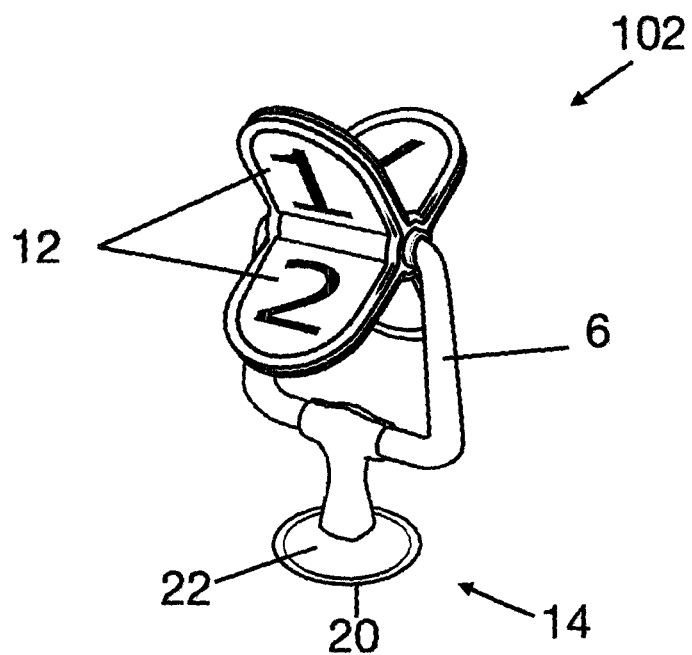
FIG. 20 shows tenth apparatus of the present invention.
Figure 21:
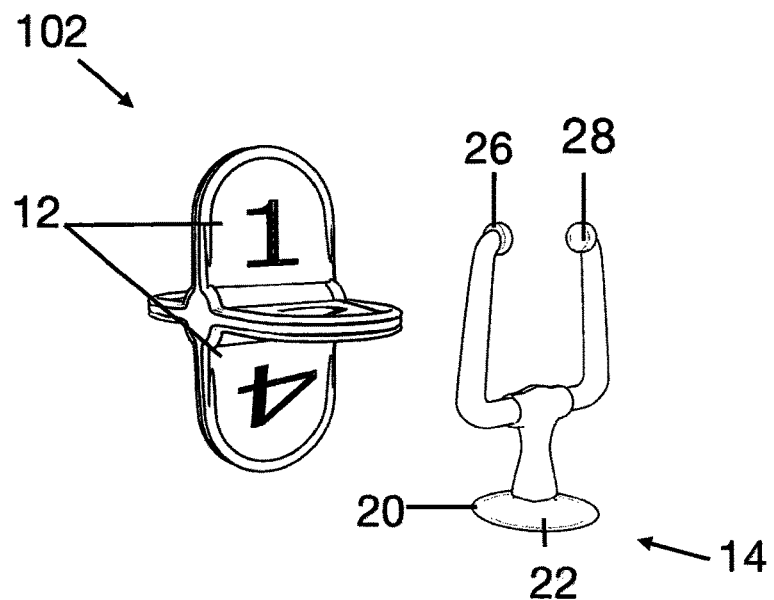
FIG. 21 is an exploded view of the apparatus shown in FIG. 20.
Figure 22:
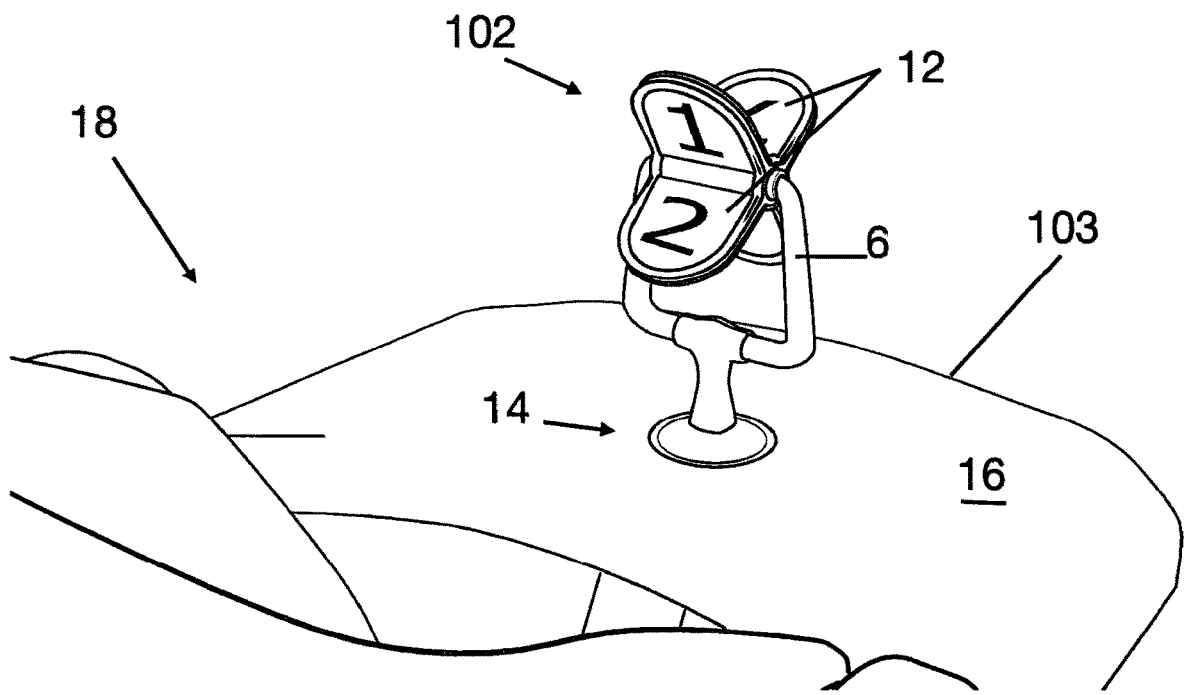
FIG. 22 shows the apparatus of FIG. 21 on a tray mounted in front of a chair.

FIGS. 20, 21 and 22 show apparatus 102 of the present invention in the form of a flicker/flip book 102, or alternatively a mounted and secured thaumatrope. The apparatus 102 is mounted on a part 16 of a tray 103 secured to a structure 18 in the form of a chair.

The apparatus of the present invention is able to be simply and inexpensively constructed. The apparatus of the present invention is easily operable and in a safe manner.

It is to be appreciated that the embodiments of the invention described above with reference to the accompanying drawings have been given by way of example only and that modifications may be effected. Thus, for example, different types of rotatable member 4, mounting means 6, viewing formations 10 and securing means 14 may be employed. The apparatus may include audio means which produced a sound when the apparatus is operated. Additionally or alternatively, the apparatus may include light means for generating light when the apparatus is operated. As shown in the drawings, the viewing formation 10 are slots so that the rotatable member 4 is in the form of a zoetrope. Alternatively, the viewing formations may include mirrors that reflect the representations and it is these reflections that are seen through the viewing formations. In this case, the apparatus may be the form of a praxinoscope. Alternatively, the viewing formations may be in one of two rotating discs, in which case the apparatus may be in the form of a phenakistiscope. Alternatively, there may be no need for viewing formations, in which case the rotatable member may be similar to a thaumatrope or a flicker/flip book. The apparatus may be electrically-operated with, for example, a simple on/off button or other switch. Individual components shown in the drawings are not limited to use in their drawings and they may be used in other drawings and in all aspects of the invention. The invention also extends to the individual components mentioned and/or shown above, taken singly or in any combination.

The invention claimed is:

1. An apparatus for providing an animated image for a viewer, the apparatus comprising:
   (i) a device for providing the animated image; and
   (ii) securing means for securing the apparatus to a part of a structure such that the apparatus is fixed with respect to the structure, and such that the device is manually operable by the viewer in order for the viewer to see the animated image;
   wherein the device comprises:
      a rotatable member configured to be manually operated from outside of the rotatable member;
      mounting means for sturdily mounting the rotatable member about an axis such that the rotatable member is configured to stably rotate about the axis;
      a series of progressively changing representations displayed on the rotatable member, the progressively changing representations being viewable by the viewer, whereby the viewer sees the animated image when the rotatable member is rotated;
   and in which:
      the mounting means and the securing means are configured to be fixed with respect to the structure, and the rotatable member is rotatable by the viewer in order for the viewer to see the animated image.

2. The apparatus according to claim 1, wherein the securing means comprises a suction device, adhesive, a hook and loop, a clamp, strap, clip, hook, tie, buckle, lock, catch, latch, stay, magnet, screw.

3. The apparatus according to claim 1, further comprises a drive member configured for manual operation by the viewer in order to manually operate the device.

4. The apparatus according to claim 3, wherein the drive member is a lever, a handle, or a crank.

5. The apparatus according to claim 1, further comprising: more than one of the devices, such that the devices are mounted side by side such that the devices are able to be operated and viewed separately or together as determined by the viewer.

6. The apparatus according to claim 1, further comprising an audio means.

7. The apparatus according to claim 1, further comprising a joint for enabling the device to be mounted at different angles with respect to the structure.

8. The apparatus according to claim 7, further comprising a locking means for locking the device in a chosen position.

9. The apparatus according to claim 1, wherein the device presents an optical illusion, wherein the device comprises a zoetrope, a praxinoscope, a phenakistiscope, a thaumatrope, a flicker book, a mutoscope, or giphoscope.

10. The apparatus according to claim 1, wherein the mounting means comprises two inwardly extending parts fitted to respective sides of the rotatable member such that the axis about which the rotatable member is configured to rotate is created between the inwardly extending parts.

11. The apparatus of claim 1, wherein:
   the rotatable member comprises a cylindrical unit having two rims and a plurality of viewing slits extending on between the rims of the cylindrical unit parallel to a central axis of cylindrical unit;
   each viewing slit extends from a respective first position proximal to a first one of the rims to a second position proximal to a second one of the rims;
   the progressively changing representations being located on an inner surface of the cylindrical unit, each representation being disposed between a pair of viewing slits, such that the representations are viewable via the viewing slits.

12. The apparatus of claim 11, further comprising:
   at least one cap capping a respective rim of the cylindrical element.

13. The apparatus of claim 12, wherein the at least one cap comprises:
   a first cap capping the first one of the rims of the cylindrical unit and a second cap capping the second one of the rims of the cylindrical unit.

14. The apparatus of claim 12, wherein the at least one cap is transparent.

15. The apparatus of claim 11, further comprising at least one ring joined to a respective rim of the cylindrical element, the ring comprising a plurality of raised portions.

16. The apparatus of claim 11, further comprising a rotatable driving unit and toothed gear wheel, wherein:
   the driving unit is disposed between the mounting means and the securing means, comprises gear wheels, and is configured to be turned by the viewer;
   the toothed gear wheel is joined to a rim of the cylindrical unit and configured to cooperate with the gear wheels of the driving unit, such that the cylindrical unit turns when the driving unit is rotated.

17. The apparatus of claim 11, wherein the mounting means comprises two inwardly extending parts fitted to respective sides of the cylindrical unit such that the axis is created between the inwardly extending parts.

18. The apparatus of claim 11, wherein the representations are removably joined to the cylindrical unit.

19. The apparatus of claim 11, wherein the mounting means and securing means are set outside the cylindrical unit or only partially penetrate the cylindrical unit, to give rise to unobstructed view of representations via the viewing slits.

20. The apparatus of claim 1, wherein the rotatable member comprises a central cylindrical body and a plurality of panels extending away perpendicularly from the cylindrical body, the representations being positioned on the panels.

* * * * *